United States Patent
Blakely

(10) Patent No.: US 7,073,463 B1
(45) Date of Patent: Jul. 11, 2006

(54) APPARATUS FOR AN UNDERWATER TERRARIUM

(76) Inventor: Daniel A. Blakely, P.O. Box 55, Brimley, MI (US) 49715

(*) Notice: Subject to any disclaimer, the term of this patent is extended or adjusted under 35 U.S.C. 154(b) by 0 days.

(21) Appl. No.: 11/074,060

(22) Filed: Mar. 8, 2005

(51) Int. Cl.
*A01K 63/00* (2006.01)

(52) U.S. Cl. .................. 119/246; 119/251; 119/256

(58) Field of Classification Search ........ 119/246–248, 119/203, 251, 256, 267; D30/104–105; 114/314, 114/334
See application file for complete search history.

(56) References Cited

U.S. PATENT DOCUMENTS

| | | | |
|---|---|---|---|
| 2,652,807 A * | 9/1953 | Washburn | 119/203 |
| 3,168,887 A * | 2/1965 | Bodell | 119/201 |
| 3,379,021 A * | 4/1968 | Link | 405/193 |
| 3,807,356 A * | 4/1974 | Pratt | 119/247 |
| 3,939,338 A * | 2/1976 | Giammalvo | 362/122 |
| 4,204,499 A | 5/1980 | Leyva | |
| 4,272,372 A * | 6/1981 | Fonseca | 210/169 |
| 4,787,336 A * | 11/1988 | Lineberry | 119/246 |
| 5,031,572 A * | 7/1991 | Dana | 119/246 |
| 5,313,912 A | 5/1994 | O'Dell | |
| 5,337,701 A * | 8/1994 | Syers | 119/251 |
| 5,347,952 A * | 9/1994 | Tsai | 119/246 |
| D351,686 S | 10/1994 | O'Dell | |
| 5,957,085 A | 9/1999 | Youngstrom | |
| 6,029,606 A | 2/2000 | Youngstrom | |
| 6,363,889 B1 | 4/2002 | Lamendola | |
| 6,520,117 B1 | 2/2003 | Wood | |
| 2005/0072369 A1* | 4/2005 | Goossen | 119/246 |

\* cited by examiner

Primary Examiner—Teri Pham Luu
Assistant Examiner—Kimberly S. Smith

(57) ABSTRACT

An underwater terrarium capable of being submerged in an aquarium. The interior of the terrarium is sealed, so it may be submerged in a tank. The terrarium has a pair of air tubes for air intake and exhaust. The intake can be connected to a standard aquarium aerator to allow air for creatures living inside the terrarium. Also included is inside the terrarium is a light controlled by an electrical cord that runs outside the tank. The electrical cord includes a dimmer switch to control the light.

1 Claim, 3 Drawing Sheets

APPARATUS FOR AN UNDERWATER TERRARIUM

BACKGROUND

1. Field

The present disclosure pertains to an apparatus for an underwater terrarium.

2. Description of Related Art

There are several terrariums in the art. Patents such as U.S. Pat. Nos. 5,313,912 5,957,085, 6,363,889, 6,029,606, 6,520,117, 4,204,499 and Des. 351,686 describe apparatuses that combine terrariums with aquariums.

While U.S. Pat. Nos. 5,313,912 5,957,085, 6,363,889, 6,029,606, 4,204,499 and Des. 351,686 are all terrariums that are underwater in aquariums, none isolate the terrarium from the water in the aquarium. In U.S. Pat. No. 6,520,117, the terrarium is not submerged below the surface of the water in the aquarium.

BRIEF DESCRIPTION OF THE FIGURES

The present invention is illustrated by way of example and not limitation in the figures of the accompanying drawings.

DETAILED DESCRIPTION

The following description provides for an apparatus for an underwater terrarium. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement the apparatus for an underwater terrarium.

The invention is a terrarium that is intended to be submerged in an aquarium. This allows a land animal to be kept in the same area as water animals for aesthetic value. The terrarium includes air hoses to provide flowing air to the animals.

Figure 1:
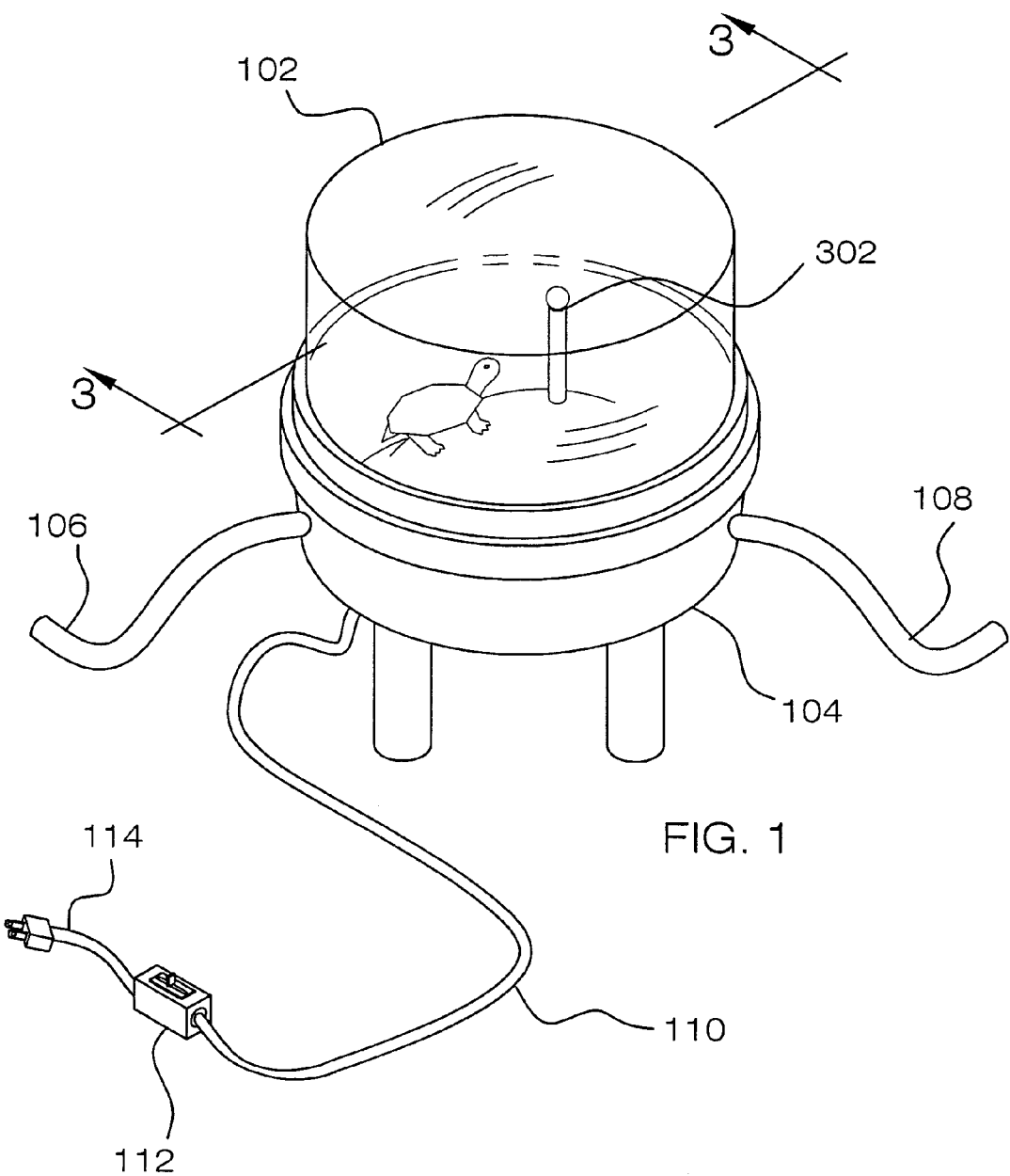
FIG. 1 illustrates a perspective view of the apparatus. Featured in the Figure are the dome (102), base (104), air intake (106), air exhaust (108), cord (110), plug 114, and dimmer switch 112.

FIG. 1 illustrates a perspective view of the apparatus. Featured in the Figure are the dome (102), base (104), air intake (106), air exhaust (108), cord (110), plug 114, and dimmer switch 112.

The base (104) is a round bowl with three legs. Each leg is a cylinder shaped and approximately three inches long. The legs are positioned equally spaced around the circumference of the bottom end of the base (104). The dome (102) is a hollow cylinder with the approximately same height and diameter as the base. The base (104) and dome (102) have rims which are indented to produce a snap-fit mate. The dome (102) engages with the base (104) to produce a hollow area that has a hermetic seal. The base (104) has an air tube attached to holes on opposite sides of the base. The air tubes (106 and 108) allow air to flow in and out of the sealed area. One tube acts as an air intake (106) and is capable of connecting to a standard aquarium aerator. The other tube, the air exhaust (108) exits the water and remains unconnected. Inside the sealed area is a light (302) and land mass (304), which are described in further detail in FIG. 3.

The plug (114) and dimmer switch (112) are connected to one end of the cord (110). The other end of the cord (110) connects to the light (302) to provide electricity. The dimmer is a slide-type lever that adjusts the current in the circuit.

In one embodiment, a heater and pump are incorporated into one or more of the legs. For example, a heater may be in one leg and a pump may be in another leg. Alternatively, both the pump and heater may be in the same leg.

Figure 2:
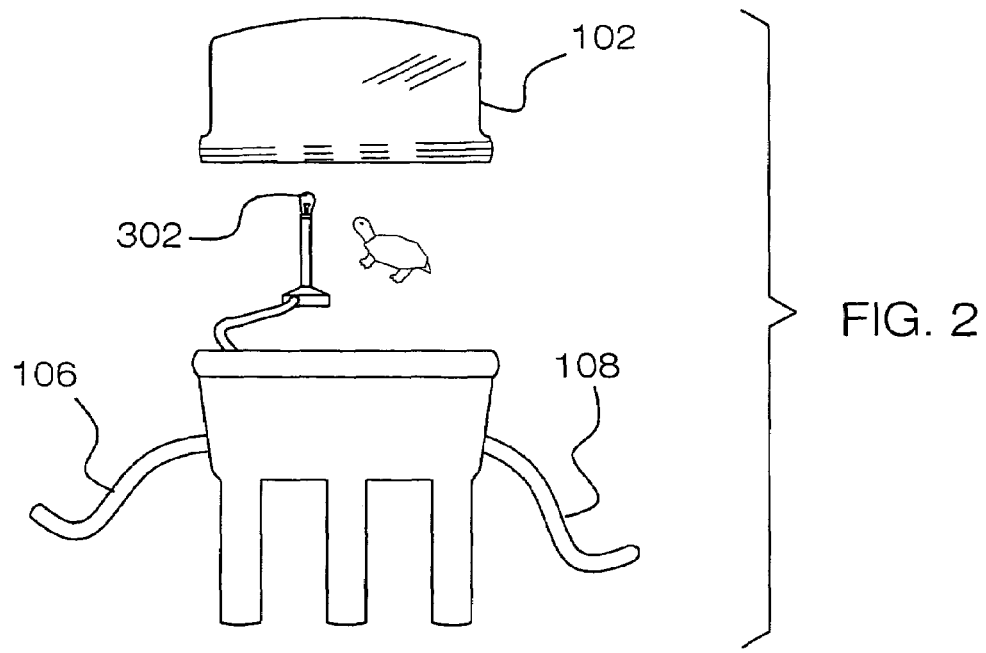
FIG. 2 illustrates a front elevational view of the embodiment in FIG. 1.

FIG. 2 illustrates a front elevational view of the embodiment in FIG. 1.

Figure 3:
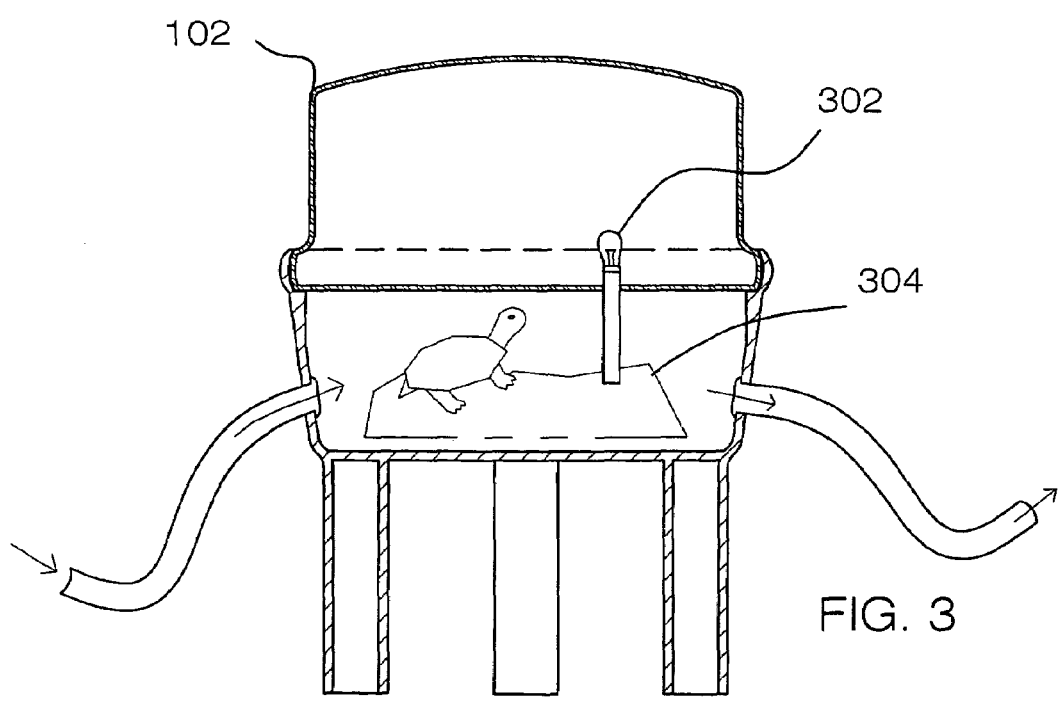
FIG. 3 illustrates a front sectional view of the apparatus. Featured in the Figure is the light (302) and land mass (304).

FIG. 3 illustrates a front sectional view of the apparatus. Featured in the Figure is the light (302) and land mass (304). The light (302) is a cylindrical post with an incandescent lamp mount at the top. The post is coupled upright in the land mass (304). The land mass (304) is an amorphous object shaped to resemble a rock.

Figure 4:
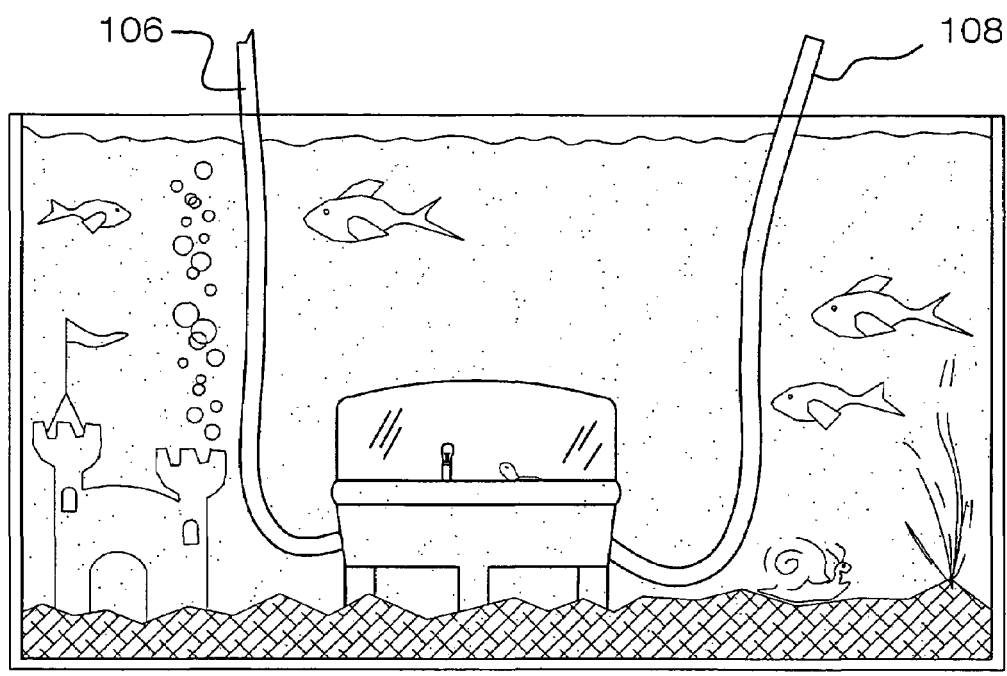
FIG. 4 illustrates a side elevational view of the apparatus in the environment in which it is associated.

FIG. 4 illustrates a side elevational view of the apparatus in the environment in which it is associated. The apparatus is submerged in an aquarium. The apparatus sits on the bottom surface inside the aquarium. The air tubes (106 and 108) extend upward above the surface of the water and out of the aquarium.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A fish tank accessory for displaying a living creature comprising:
   a base to be supported by a plurality of legs;
   a transparent dome inserted over the base providing an airtight storage for the living creature with no entry or exit openings for the living creature, the living creature to only be removed from the accessory by a user removing the transparent dome from the base;
   a light in the base connected to a dimmer switch;
   an air intake hose inserted into the base for supplying air to the accessory; and
   an air outtake hose inserted into the base for supplying air from the accessory, the air intake hose and air outtake hose manually permitting air flow in and out, respectively.

* * * * *